(12) United States Patent
Shemesh

(10) Patent No.: US 6,847,939 B1
(45) Date of Patent: Jan. 25, 2005

(54) SYSTEM AND METHOD OF CONDUCTING ON-LINE AUCTIONS

(75) Inventor: Yair Shemesh, Tivon (IL)

(73) Assignee: Olsale.com Ltd., Tel Aviv (IL)

( * ) Notice: Subject to any disclaimer, the term of this patent is extended or adjusted under 35 U.S.C. 154(b) by 0 days.

(21) Appl. No.: 09/443,111

(22) Filed: Nov. 18, 1999

(51) Int. Cl.$^7$ .............................................. G06F 17/60
(52) U.S. Cl. ................. 705/26; 705/37; 705/1
(58) Field of Search ................ 705/26, 1, 14, 705/35, 37

(56) References Cited

U.S. PATENT DOCUMENTS

| | | | | |
|---|---|---|---|---|
| 5,774,873 A | * | 6/1998 | Berent et al. | 705/26 |
| 5,794,207 A | * | 8/1998 | Walker et al. | 705/1 |
| 5,794,219 A | * | 8/1998 | Brown | |
| 5,890,138 A | * | 3/1999 | Godin et al. | 705/26 |
| 5,924,082 A | | 7/1999 | Silverman | |
| 6,085,169 A | * | 7/2000 | Walker et al. | 705/26 |
| 6,108,639 A | * | 8/2000 | Walker et al. | 705/26 |
| 6,119,100 A | * | 9/2000 | Walker et al. | 705/14 |
| 6,134,534 A | * | 10/2000 | Walker et al. | 705/26 |
| 6,167,386 A | * | 12/2000 | Brown | 705/26 |
| 6,199,050 B1 | * | 3/2001 | Alaia et al. | 705/1 |
| 6,285,989 B1 | * | 9/2001 | Shoham | 705/35 |
| 6,356,878 B1 | * | 3/2002 | Walker et al. | 705/26 |
| 6,415,270 B1 | * | 7/2002 | Rackson et al. | 705/37 |

OTHER PUBLICATIONS

Press release, "Auction Universe Network Marks Unprecedented Growth", PR Newswire; New York: Jun. 19, 1998 extracted on Internet from http://www.umi.com.*

"Online auctions" by Huhns, M.N.; Vidal, J.M., IEEE Internet Computing, vol.:3 Issue, May–Jun. 1999 extracted on Internet from http://ieeexplore.ieee.org on May 6, 2002.*

Press release, "Pioneering Reseller Sites", Computer Reseller News; Manhasset; Nov. 18, 1996; p. 206; extracted from http://proquest.umi.com on Oct. 22, 2003.*

McDonald, Glenn; "The Bidding Game", PC World Online; San Francisco: Aug. 28, 1998; p. 1; extracted from http://proquest.umi.com on Oct. 22, 2003.*

* cited by examiner

Primary Examiner—Jeffrey A. Smith
Assistant Examiner—Yogesh Garg
(74) Attorney, Agent, or Firm—Mark M. Friedman

(57) ABSTRACT

A system for conducting on-line auctions of products is disclosed. The system comprises (a) a database server system being for storing and providing on demand, information pertaining to a plurality of products to be auctioned, the database server system further being for receiving a number of bids on a product of the plurality of products when the product is auctioned, the number of the bids received being for determining a quantity of the product auctioned; and (b) a plurality of user clients each being operable by a specific user and each being for establishing communication with the database server system, each of the plurality of user clients being for receiving from the database server system information pertaining to the product auctioned and for relaying to the database server system a bid on the product auctioned.

26 Claims, 1 Drawing Sheet

SYSTEM AND METHOD OF CONDUCTING ON-LINE AUCTIONS

FIELD AND BACKGROUND OF THE INVENTION

The present invention relates to a system and method for conducting on-line auctions of products and, more particularly, to an on-line auction system and method which enables bidders to bid and track, in real-time, an auction which is conducted for a short period of time and in which the quantity of the product auctioned changes according to the number of bidders participating in the auction.

Auctions provide a unique and exciting product purchasing environment. In the past, auctions were exclusively devoted to the sale of valuable products such as fine art, collectibles and luxury items. Thus, participation in these auctions was reserved for the extremely wealthy.

With the advent of telecommunications, auctions have become available to the general public.

For example, the use of television to auction items is described in an article entitled "Auctions Become High Tech", Dealer Business, March 1995 V29 N7. The article describes an auction system in which an auction company sends a signal via satellite to the televisions of individual car dealers. The dealers view the car for sale on their televisions and bid on the car using a telephone or a remote terminal.

The widespread acceptability of the Internet as a connectivity medium has generated numerous Internet based auctions. These so called "on-line auctions" enable individuals to bid on a plethora of products typically ranging in price from several dollars to several thousand dollars or more.

Several on-line auctions are now being conducted over the Internet, either through electronic mail based bidding or web page based bidding. One example to electronic mail bidding is described in an article entitled "Cathay Pacific Airways-USA to Hold First Ever Internet CyberAuction" Business Wire, Sep. 26, 1995 p926–1084. This article describes how registered bidders can bid for airline tickets by submitting concealed bids through the electronic mail over a two week bidding session. The fifty highest bidders at the close of the bidding session receive an electronic mail message instructing them on how to purchase tickets.

More advanced on-line auctions are conducted through worldwide web sites, see for example, http://www.ebay.com or http://www.dealdeal.com. In these auction systems, bidders submit bids and are able to track the bidding in real-time through the Internet. Items for sale are graphically displayed on the bidders' screens, in addition to the bid information for each item. Bid information is updated throughout each bidding session which can last days or weeks.

Although on-line auctions present numerous advantages to both the seller and buyers, such auctions suffer from several inherent limitations.

Although bidding is conducted on-line, bidders cannot access or view the actual biding process but are typically periodically informed of the status of an auction either by electronic mail or web site updates.

In addition, since on-line auctions are oftentimes conducted over an extended time period, bidders spend a considerable amount of time tracking the status of their bid. On-line auctions are typically of the ascending-bid variety, bidders submit bids in real time dynamic process until no more bids are forthcoming. In such a format, each bidder is able to view information on other bids and as the auction progresses incorporate this information into subsequent bids thereof. Although this feedback tends to result in more efficient auction outcomes as well as more aggressive bidding which results in higher expected revenues for the seller, it has the disadvantage that in complex environments the auction may last for a long time, and require serious bidders to devote substantially all their time during this extended period of the auction.

There is thus a widely recognized need for, and it would be highly advantageous to have, an on-line auction method devoid of the above limitations.

SUMMARY OF THE INVENTION

According to one aspect of the present invention there is provided a system for conducting on-line auctions of products, the system comprising (a) a database server system being for storing and providing on demand, information pertaining to a plurality of products to be auctioned, the database server system further being for receiving a number of bids on a product of the plurality of products when the product is auctioned, the number of the bids received being for determining a quantity of the product auctioned; and (b) a plurality of user clients each being operable by a specific user and each being for establishing communication with the database server system, each of the plurality of user clients being for receiving from the database server system information pertaining to the product auctioned and for relaying to the database server system a bid on the product auctioned.

According to another aspect of the present invention there is provided a method of conducting an on-line auction, the method comprising the steps of (a) providing, via a communication network, information pertaining to a product auctioned; (b) receiving ascending bids from bidders for the product; (c) correlating a quantity of the product auctioned to a number of the bidders; and (d) declaring at least one winning bid of the ascending bids, the at least one winning bid being determined according to a bid amount and further according to the quantity of the product auctioned.

According to further features in preferred embodiments of the invention described below, the step of providing, via a communication network, information pertaining to a product auctioned is effected by a demand of the bidders.

According to still further features in the described preferred embodiments the amount of the winning bid of the ascending bids is higher than an amount of a reserved bid for the product.

According to still further features in the described preferred embodiments the amount of the reserved bid changes as a function of bid amounts of at least two bids of the number of bids and the number of bids received by database server system.

According to still further features in the described preferred embodiments the information pertaining to the product auctioned includes an acceptable bid amount for the product.

According to still further features in the described preferred embodiments the information pertaining to the products auctioned includes a reserved bid amount, the reserved bid amount changes as a function of bid amounts of at least two bids of the number of bids and the number of bids received by database server system.

According to still further features in the described preferred embodiments, in a case where no bids have been received by the database server system, the acceptable bid amount is a starting bid amount.

According to still further features in the described preferred embodiments, in a case where at least one bid has been received by the database server system, the acceptable bid amount is higher than a highest bid amount received by the database server system.

According to still further features in the described preferred embodiments, the information pertaining to the product auctioned includes information selected from the group consisting of a description of the product, a suggested retail price of the product, a quantity auctioned of the product, a time remaining to bid and a number of bids accepted for the product.

According to still further features in the described preferred embodiments, the communication between each of the user clients and the database server system is established and maintained through a mode selected from the group consisting of a dialup connection mode and a local area network connection mode.

According to still further features in the described preferred embodiments, the database server system is a part of the World Wide Web and further wherein the information pertaining to the plurality of products to be auctioned is included within a web site. According to still further features in the described preferred embodiments, the user client operates a web browser.

According to still further features in the described preferred embodiments, the database server system receives bids for the product auctioned for a time period selected from within a range of 10 minutes to 120 minutes.

According to still further features in the described preferred embodiments, at least one winning bid is determined according to a bid amount and further according to the quantity of the product auctioned.

According to still further features in the described preferred embodiments, the database server system stores information relating to each specific user thereof.

According to still further features in the described preferred embodiments, the information includes information provided by the specific user.

According to still further features in the described preferred embodiments, the information includes information collected on the specific user by the database system, which information relates to a profile of the user.

The present invention successfully addresses the shortcomings of the presently known configurations by providing a system and method capable of conducting an auction for a product while allowing users real-time access to the auction process, thereby mimicking live auctions in which the participants actively take part in the auction process, yet providing bidders with advantages gained from the ability to remotely participate in the auction process and to receive a vast amount of information, in electronic form, pertaining to auctioned products.

BRIEF DESCRIPTION OF THE DRAWINGS

The invention is herein described, by way of example only, with reference to the accompanying drawing. With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

Referring to the drawing wherein.

DESCRIPTION OF THE PREFERRED EMBODIMENTS

Figure 1:
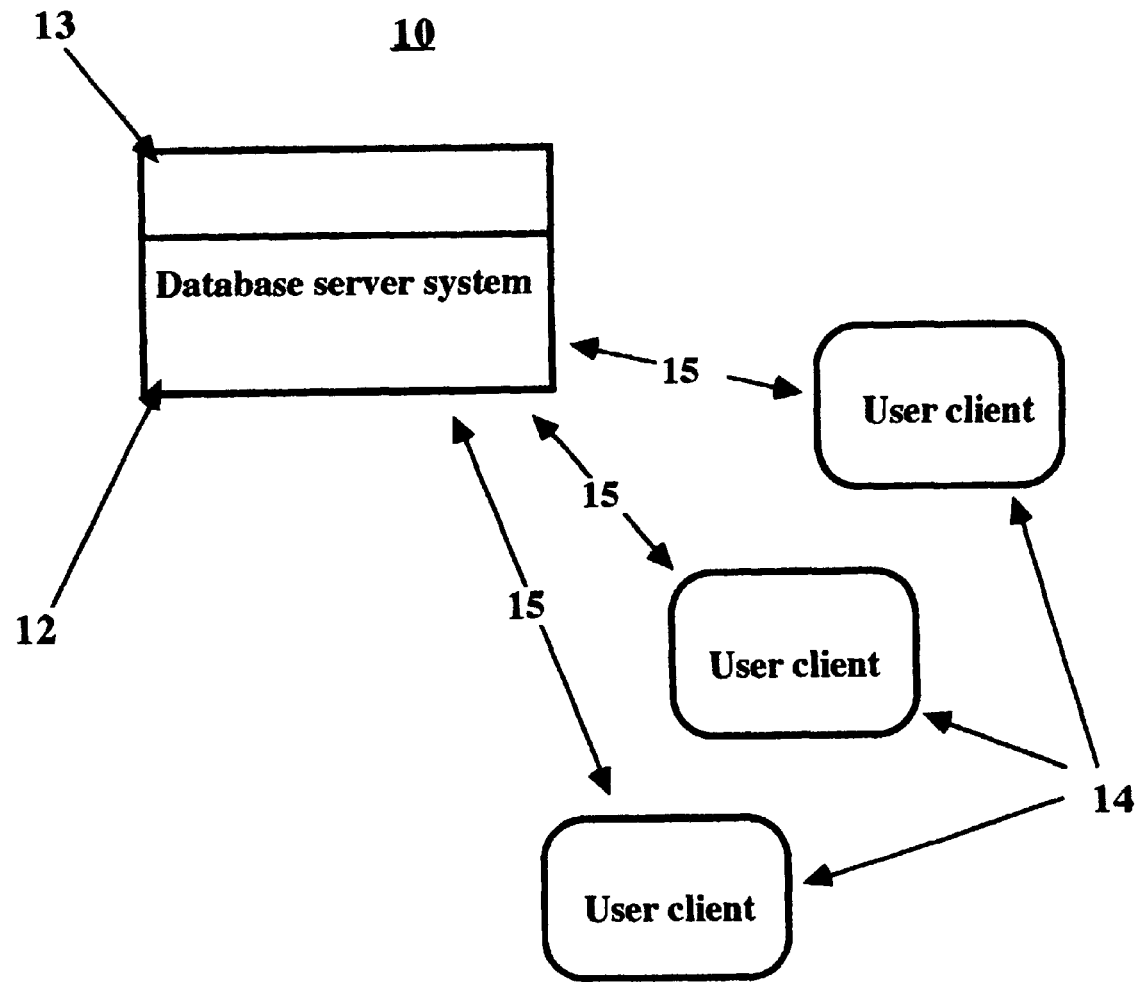
FIG. 1 is a black box diagram of a system for conducting on-line auctions according to the present invention.

The present invention is of a system and method which can be used to conduct an on-line auction. Specifically, the present invention can be used to conduct an on-line auction in which bidders can track, in real-time, the auction and in which the quantity of a product auctioned changes according to the number of bidders participating in the auction.

The principles and operation of the system and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Referring now to the drawing, FIG. 1 illustrates the system for conducting on-line auctions of products according to the present invention which is referred to hereinunder as system 10.

The term "product" is used herein to refer to any consumer item either perishable or non-perishable. In addition a product also refer to services rendered, in which case the product is represented by credit, voucher or a ticket which entitle the bearer thereof with rights to a service or services.

System 10 includes a database server system 12. Database server system 12 serves for storing and providing, on demand, information pertaining to a plurality of products to be auctioned. Database server system 12 also serves for receiving any number of bids on a product which is currently auctioned. Database server system 12 is configured such that the number of bids and/or the amount of each bid received thereby serves to determine a quantity of the product currently auctioned. That is to say, the quantity of the product currently auctioned, increases with an increase in the number of bids placed for this product. It will be appreciated that a maximum auctionable quantity of a product is predetermined by database server system 12 according to the type of product auctioned and an estimated value of the product. It will be appreciated that in order to process the information received thereby, database server system 12 includes a processing unit 13 which serves to process the information received such that some of the information provided is constantly updated.

System 10 further includes a plurality of user clients 14. Each of user clients 14 is capable of establishing communication with database server system 12 through either a dialup connection or a local area network (as indicated by 15).

As used herein in the specification and in the claims section that follows, the phrase "user client" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™ Nokia Communicator™ or any other handheld device; or any other known and available operating system. The term further includes mobile cellular telephone devices and mobile cellular communicator devices having, in addition to telephone properties, capabilities similar to those of a personal computer (PC) or a personal digital assistant (PDA).

Hereinafter, the term "Windows™" includes but is not limited to Windows95, Windows 3.x™ in which "x" is an integer such as "1", Windows NT™, Windows98, Windows CE™ and any upgraded versions of these operating systems by Microsoft Inc. (Seattle, Wash., USA).

User client 14 serves for receiving information from server system 12 and for relaying user provided information to server system 12. The information received by client 14 includes information pertaining to products stored in server system 12, such as, for example, product description, auction times for each product, initial quantity of the product offered when auctioned, suggested retail price and the like. In addition, information received by client 14 includes information specific to each product currently auctioned. Such information includes acceptable bid amount which can depend for example, on a current highest bid amount, and a reserved bid amount, which must be surpassed by a bidder in order for that bidder to be eligible to purchase the product auctioned. In addition this information also includes time remaining to bid, minimal amount of next acceptable bid, quantity of the product offered, and the like. It will be appreciated that information pertaining to a product auctioned is received by user client 14 in real time at the time the auction is conducted. Thus, a user operating client 14 can decide if to bid or not according to, for example, the current highest bid amount information, time remaining to bid information, and quantity of product information. It will be appreciated that when a bid placed by a user using client 14 is accepted by server system 12 the information providable from server system 12 to a user on a product auctioned is immediately updated.

In addition to providing the bid information described above client 14 can also serve to provide server system 12 with user specific information which is preferably stored within server system 12. Such information can include personal registration information, such as personal identification and password, which enables a user to access the information provided by server system 12, and billing information which can be used to bill a user which has placed a winning bid and as such is now eligible to purchase the product auctioned. Such information can also include a user personal profile information including, for example, products most preferred by a user and the like. It will be appreciated that the personal profile information of a user can be used to notify such a user of upcoming auctions of interest. Furthermore, statistical data compiled and extracted from the personal profiles of numerous users can be used to provide products which are in demand by the users.

It will be appreciated that any or all of the above information providable to client 14 by server system 12 can be displayed by client 14 in a textual, graphical (image or video) or audio format. Similarly, the information provided by the user via user client 14 can also be provided in such formats.

According to a preferred embodiment of the present invention the bids are accepted in an ascending order wherein a bid accepted by server system 12 must be higher than a previously accepted highest bid. In this case, information pertaining to a product currently auctioned includes a minimum bid amount acceptable. It will be appreciated that initially, at the onset of auctioning, a first bid accepted must be equal to or higher than a minimum starting bid which is predetermined for each product auctioned. It will further be appreciated that a specific user can raise the amount of a bid placed thereby at any point during the auction. Thus, for example, a user which has been outbided by a bidder or bidders can update his or her bid to an amount which is higher than the current highest bid. It will further be appreciated that a starting bid can be lower than a reserved bid set for a product, however, if upon termination of an auction the highest bid is below the reserved bid, then none of the bidder are eligible to purchase the product auctioned.

It will be appreciated in this case that a reserved bid amount can change according to the number of users participating in the auction. For example, if a plurality of users are bidding on a product, the reserved bid can change according to the number of users and the amount of bids placed thereby. Thus according to the present invention, if a large number of users are bidding the reserved bid is lowered so as to enable bidders to surpass the reserved bid amount. If, in this case a reserved bid is surpassed, then the quantity of the product offered is increased. The added product(s) is then auctioned at a reserved bid amount equal to the reserved bid amount determined by the previous auction.

According to another preferred embodiment of the present invention an auction is typically conducted for a time period of anywhere between 10 minutes and 120 minutes. This feature of the present invention is distinctly different than that of prior art on-line auction in which an auction typically lasts hours to days.

It will be appreciated that conducting relatively short auction session is advantageous to both the user and operator of system 10 because it enables the operator to conduct more auctions in a given time period, while enabling the user to follow an entire bidding process of an auction, in real-time, and as such track bidding events, so as to be able to react, in real time, to any of these events. It will further be appreciated that in order to conduct relatively short bidding sessions, the users of an on-line auction system must be able to view and interact with the auction process in real time. This feature is only provided by the system of the present invention and as such short auction sessions can only be implemented by the system of the present invention.

According to another preferred embodiment of the present invention database server system 12 is connected to the World Wide Web. Thus the information providable by server system 12 can be provided to a user via a web site interface. In this case, client 14 is preferably a personal computer operating a web browser program, such as, for example, Netscape Communicator™, Internet Explorer™, Opera™, iCab™, Mosaic™, and the like.

By using a web browser program a user of system 10 can interactively access the information provided by server system 12 via a web site, such that information provided by the user can be communicated to server system 12 via the web site. It will be appreciated that such two way communication between server system 12 and a user operated web browser via a web site can be, for example, provided through common gateway interface (CGI).

Using CGI scripts the information included within server system 12 can be ported to the World Wide Web via a web site interface in a manner which allows users to dynamically interact with the information. The utilization of CGI scripts for such purposes is well known in the art of computers and as such no further detail is included herein.

Thus, in this case, a web site which forms the interface for server system 12 includes a plurality of web pages each of which displays a portion of the information providable by server system 12. For example, a specific web page of the web site can include information on all the products to be auctioned including manufacturers description starting bid auction times and the like. Another web page can display an auction or auctions which are currently active including information of the status of bidding and the like.

Thus, a user can access the information provided by the various web pages by simply browsing through these web pages of the web site. It will be appreciated that since web sites are typically accessible by the general public, web pages which include information on, for example, the current status of bidding are only accessible to registered users of system or to registered users who have placed a bid or intend to bid. Thus, the information pertaining to, for example, products to be auctioned is accessible by the general public while auction specific information is accessible only to the registered users of system 10. This allows individuals unfamiliar with system 10 to get descriptive information on system 10 and to also register if they wish to bid on current or future auction products.

According to another embodiment of the present invention user client 14 can operate a dedicated software program and which is configured for communicating solely with server system 12. Such communication can be supported by, for example, hyper text transfer protocol (HTTP) or file transfer protocol (FTP) communication, or an other suitable communication protocol. In any case, this embodiment of client 14 functions similarly to a web browser program.

System 10 according to the present invention is used to conduct an auction as follows. Once an auction for a specific product of a specified quantity commences users are allowed to place bids on the product. Users placing bids on this product are listed by server system 12, which list is viewable by registered users participating or wishing to participate in the bidding process. Such a list can include a portion or all of the bid accepted displayed, for example, in a table format or any other format, or alternatively, only the highest current bid is displayed. A registered use using, for example, a web browser program can then place a bid by, for example, selecting, for example, a "place bid" button provided on a wet page, which when selected, places a bid for that user. A newly placed bid is higher than a current highest bid by a an amount predetermined by system 10. Following acceptance of the bid, the list is automatically updated indicating a new highest bid. As mentioned hereinabove, serve system 12 tracks the number of users placing bids so as to change the quantity of the product auctioned, accordingly. It will be appreciated that this novel feature of system 10 of the present invention is advantageous to both the user and operator of system 10. For example, by auctioning more than a single product, say for example five products, users which have placed bids lower than the highest bid of the auction but higher than a reserved bid amount for that product also have a chance of winning. At the end of a bidding session, winning bids are determined and the users which have placed the winning bids are notified, by, for example, an electronic mail message. Thereafter, these users are billed either directly, by using the billing information included in each user's personal profile information, or indirectly, by having each of the users provide billing information.

Since according to the present invention, a higher number of users translates into higher bid amounts, by increasing the quantity of the product which is auctioned in proportion to the users participating in an auction, an operator of system 10 benefits from sales of a large number of products at a relatively high price.

Thus, according to the present invention there is provided a system and method for conducting on-line auctions which system and method provide both the operator and the user with several distinct advantages over prior art on-line auctioning systems and methods.

By conducting an auction for a product while allowing users real-time access to the auction process, the present invention mimics live auctions in which the participants actively take part in the auction process, yet provides bidders with advantages gained from being able to remotely participate in the auction process and being able to receive a vast amount of information, in electronic form, pertaining to auctioned products.

Furthermore, increasing the quantity of a product auctioned in response to the number of users bidding, and lowering the reserved bid amount set for a product as a function of bid amounts and the number of bidders results in added benefits to both the user and the operator of system 10.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for conducting on-line auctions of products such that the quantity of products offered for auction varies, the system comprising:
   (a) a database server system being for storing and providing on demand, information pertaining to a plurality of products to be auctioned, said database server system further being for receiving a number of competing bids on a product of said plurality of products when said product is auctioned;
   (b) a plurality of user clients each being operable by a specific user and each being for establishing communication with said database server system, each of said plurality of user clients being for receiving from said database server system information pertaining to said product auctioned and for relaying to said database server system a bid on said product auctioned; and
   (c) an executable program stored in the server system to implement the following functions:
   (i) receiving via an electronic communication medium competing bids from a plurality of bidders, each of said bids pertaining to at least one of the products, each of said bids having a bid value which exceeds values of all previously received bids; and
   (ii) automatically varying said variable quantity of the products offered for auction responsively to at least a number of said bidders who have placed said bids such that said variable quantity of the products increases with an increasing number of said bidders.

2. The system of claim 1, wherein said information pertaining to said product auctioned includes an acceptable bid amount for said product.

3. The system of claim 2, wherein, in a case where no bids have been received by said database server system, said acceptable bid amount is a starting bid amount.

4. The system of claim 2, wherein said information pertaining to said products auctioned includes a reserved bid amount, said reserved bid amount changes as a function of bid amounts of at least two bids of said number of bids and said number of bids received by database server system.

5. The system of claim 2, wherein in a case where at least one bid has been received by said database server system, said acceptable bid amount is higher than a highest bid amount received by said database server system.

6. The system of claim 1, wherein said information pertaining to said product auctioned includes information selected from the group consisting of a description of said product, a suggested retail price of said product, a quantity auctioned of said product, a time remaining to bid and a number of bids accepted for said product.

7. The system of claim 1, wherein said communication between each of said user clients and said database server system is established and maintained through a mode selected from the group consisting of a dialup connection mode and a local area network connection mode.

8. The system of claim 1, wherein said database server system is a part of the World Wide Web and further wherein said information pertaining to said plurality of products to be auctioned is included within a web site.

9. The system of claim 8, wherein said user client operates a web browser.

10. The system of claim 1, wherein said database server system receives bids for said product auctioned for a time period selected from within a range of 10 minutes to 120 minutes.

11. The system of claim 1, wherein at least one winning bid is determined according to a bid amount and further according to said quantity of said product auctioned.

12. The system of claim 1, wherein said database server system stores information relating to each specific user thereof.

13. The system of claim 12, wherein said information includes information provided by said specific user.

14. The system of claim 12, wherein said information includes information collected on said specific user by said database system, which information relates to a profile of said user.

15. A method of conducting an on-line auction of a product such that the quantity of product offered for auction varies, the method comprising the steps of:
   (a) providing, via a communication network, information pertaining to a product auctioned;
   (b) receiving via the electronic communication medium competing bids from a plurality of bidders for said product, each of said bids having a bid value which exceeds values of all previously received bids;
   (c) automatically varying said variable quantity of the said product offered for auction responsively to at least a number of said bidders who have placed said bids such that said variable quantity of the said product increases with an increasing number of said bidders; and
   (d) declaring a number of said competing bids having highest bid values as winning bids, said number of competing bids corresponding to said quantity of said product auctioned, each of said winning bids enabling purchase of the said product at the corresponding bid value.

16. The method of claim 15, wherein said information pertaining to said product auctioned includes an acceptable bid amount for said product.

17. The method of claim 15, wherein said information pertaining to said product auctioned also includes information selected from the group consisting of a description of said product, a retail price of said product, a quantity auctioned of said product, a time remaining to bid and a number of bids accepted for said product.

18. The method of claim 15, wherein said communication network is the World Wide Web.

19. The method of claim 15, wherein the step of receiving ascending bids from bidders is effected for a time period selected from within a range of 10 minutes to 120 minutes.

20. The method of claim 15, wherein the step of providing, via a communication network, information pertaining to a product auctioned is effected by a demand of said bidders.

21. The method of claim 15, wherein said quantity of said product auctioned is increased with an increase to said number of said bidders.

22. The method of claim 15, wherein an amount of said winning bid of said ascending bids is higher than an amount of a reserved bid for said product.

23. The method of claim 22, wherein said amount of said reserved bid changes as a function of bid amounts of at least two bids of said number of bids and said number of bids received by database server system.

24. A method for executing an automated auction of items such that the quantity of items offered for auction varies in response to the number of bidders placing bids, comprising:
   (a) setting a variable quantity of the items offered for auction to an initial value;
   (b) receiving via an electronic communication medium competing bids from a plurality of bidders, each of said bids pertaining to at least one of the items, each of said bids having a bid value which exceeds values of all previously received bids;
   (c) automatically varying said variable quantity of the items offered for auction responsively to at least a number of said bidders who have placed said bids such that said variable quantity of items increases with an increasing number of said bidders; and
   (d) declaring a number of said competing bids having highest bid values as winning bids, said number of competing bids corresponding to said variable quantity of the items offered for auction, each of said winning bids enabling purchase of at least one of the items at the corresponding bid value.

25. The method of claim 24, wherein said variable quantity of the items offered for auction is further varied responsively to said bid values of said competing bids received such that said variable quantity of items increases with increasing bid values.

26. A method for executing an automated auction of items such that the quantity of items offered for auction varies in response to the value of the bids made, comprising:
   (a) setting a variable quantity of the items offered for auction to an initial value;
   (b) receiving via an electronic communication medium competing bids from a plurality of bidders, each of said bids pertaining to at least one of the items, each of said bids having a bid value which exceeds values of all previously received bids;
   (c) automatically varying said variable quantity of the items offered for auction responsively to said bid values of said competing bids received such that said variable quantity of items increases with increasing bid values;
   (d) automatically varying said variable quantity of the items offered for auction is further varied responsively to a number of said bidders who have placed said bids such that said variable quantity of items increases with an increasing number of said bidders; and
   (e) declaring a number of said competing bids having highest bid values as winning bids, said number of competing bids corresponding to said variable quantity of the items offered for auction, each of said winning bids enabling purchase of at least one of the items at the corresponding bid value.

* * * * *